Oct. 7, 1941.    U. A. INMAN    2,258,011
MEANS OF ATTACHING WHEEL BALANCE WEIGHTS
Filed Sept. 11, 1940
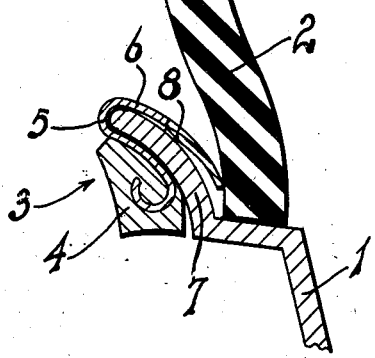
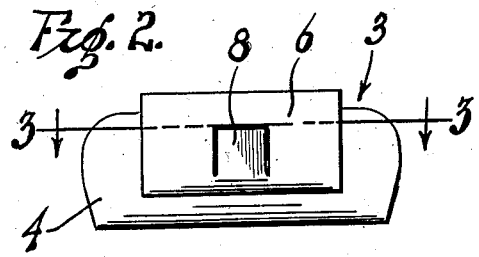
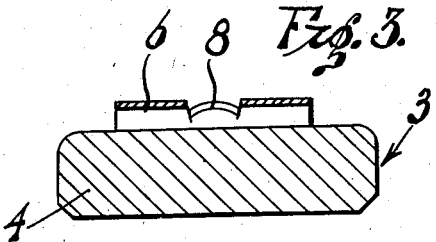
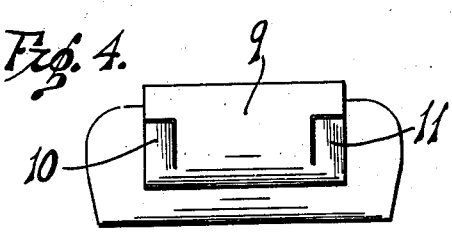
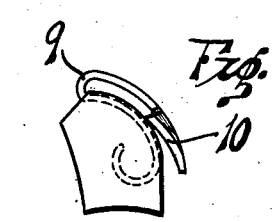
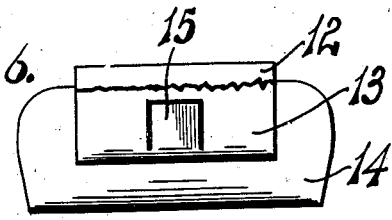
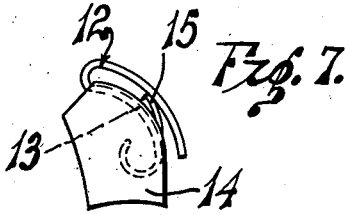
INVENTOR.
ULYSSES A. INMAN.
BY
ATTORNEY.

Patented Oct. 7, 1941

2,258,011

UNITED STATES PATENT OFFICE 2,258,011

MEANS OF ATTACHING WHEEL BALANCE WEIGHTS

Ulysses A. Inman, Long Beach, Calif.

Application September 11, 1940, Serial No. 356,252

4 Claims. (Cl. 301—5)

This invention relates to a means of attaching wheel balance weights. Weights of the type necessary to balance the wheels of vehicles consist essentially of a lead body, and a clip fixedly attached to this body, which engages the wheel rim. The inner portion of this clip fits between the inner face of the rim and the outer face of the tire. Due to the vibration imparted to the wheel and also due to the kneading action of the tire, the metal clip is frequently forced outwardly and eventually flies off of the wheel, especially at high speeds.

An object of my invention is to provide a novel means on the clip which engages the rim of the wheel to prevent the weight clip from being forced off of the rim.

Another object of my invention is to provide a novel means of attaching the balance weights of the character stated, including a spur integral with the weight clip, which engages the metal rim of the wheel and effectively prevents accidental removal of the weight.

Still another object is to provide a device of the character stated, which is simple in construction, inexpensive to manufacture, and effective in use.

Other objects, advantages and features of invention may appear from the accompanying drawing, the subjoined detailed description, and the appended claims.

In the drawing:

Figure 1 is a fragmentary, transverse, sectional view of a rim and tire, with my clip attached to the rim.

Figure 2 is a side elevation of a wheel balance weight embodying my invention.

Figure 3 is a sectional view taken on line 3—3 of Figure 2.

Figure 4 is a side elevation of a modified form of wheel balance weight, embodying my invention.

Figure 5 is an end view of the same.

Figure 6 is a side elevation of still another modified form of clip embodying my invention, with parts broken away to show interior construction.

Figure 7 is an end view of the same.

Referring more particularly to the drawing, the numeral 1 indicates the usual metal rim of a vehicle rim, and 2 indicates the rubber casing which is mounted on the wheel. The wheel balancing weight 3 consists of a body 4, which is usually lead. A clip 5 is fixedly attached in the body 4, preferably by molding or casting the body around the outer portion of the clip. This is usual and well-known, and forms no part of my invention. The clip 5 is preferably made of a spring metal, such as steel, and consists of an outer finger 6, which fits over the edge of the rim, substantially as shown.

A vehicle wheel is usually made of metal, and the flange 7 is usually quite smooth, and heretofore the clip 5 has only frictionally engaged the flange to hold the weight body 4 in position. I provide a spur 8, which is integrally formed with the clip 5, and is preferably struck from this clip. The edges of the spur are bent downwardly to form a convex surface, substantially as shown in Figure 3. The outer edges of the spur thus form sharp knife-like points, which dig into the metal rim when the clip is in position, and thus will effectively prevent removal of the clip and its attached weight body. It is to be noted that the free end of the spur 8 is positioned above the inner edge of the clip 5, and thus outward movement of the clip will tend to force the sharp edges of the spur into the rim.

In Figures 4 and 5, the clip 9 is formed with spurs 10 and 11 at each edge, and these spurs are struck from the metal of the clip and are also convexly curved so that the sharp edges of the clip will dig into the rim of the wheel.

In Figures 6 and 7, the clip 12 includes an inner arm 13, which is substantially flush with the inner edge of the weight body 14. A spur 15 is struck from this arm 13, and is preferably concavely bent so as to form sharp edges which project outwardly and engage the outer surface of the flange 7 of the rim 1.

It is to be noted that the spurs on the clip, and particularly the type shown in Figures 2 and 3, will dig into the rim and thus prevent side shifting of the weight. If the tire becomes soft or flat, the weights might shift and with the spur constructed as herein shown, this shifting is prevented. The spur will so tenaciously bite into the rim when the weight is attempted to be removed that frequently the clip will break before the weight can be entirely removed from the rim.

Having described my invention, I claim:

1. A means of attaching wheel balance weights, including a weight body and a clip fixedly attached thereto, of a spur struck from the clip, the free edge of said spur being adapted and arranged to engage the rim of the wheel, said spur being bent transversely to form sharp edges engageable with the wheel rim.

2. A means of attaching wheel balance weights comprising a weight body, a clip fixedly attached to the body, said clip fitting over the flange of the rim of the wheel, an elongated spur struck from the clip, said spur being bent transversely to form sharp edges engageable with the rim of a wheel, on retraction of the weight.

3. A means of attaching wheel balance weights comprising a weight body, a clip fixedly attached to the body, said clip fitting over the flange of the rim of the wheel, a pair of elongated spurs struck from the clip adjacent each edge thereof, said spurs being bent transversely to form sharp edges engageable with the rim of a wheel.

4. A means of attaching wheel balance weights comprising a weight body, a clip fixedly attached to the weight body, said clip including a finger spaced from the weight body and engageable with the rim of a wheel, an elongated spur struck from the clip opposite the spaced finger said spur being free of the clip on three sides, said spur projecting outwardly to engage the rim of the wheel, on retraction of the weight, and said spur having substantial width.

ULYSSES A. INMAN.